Feb. 17, 1931.    G. Z. MICHAELS    1,792,503
DIRIGIBLE HEADLIGHT
Filed March 23, 1929    2 Sheets-Sheet 1
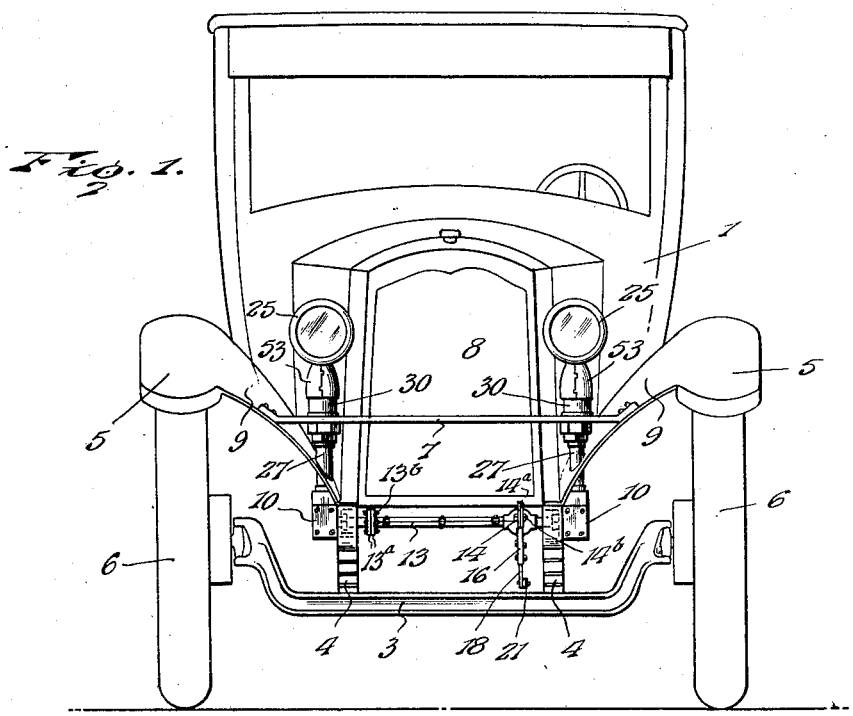
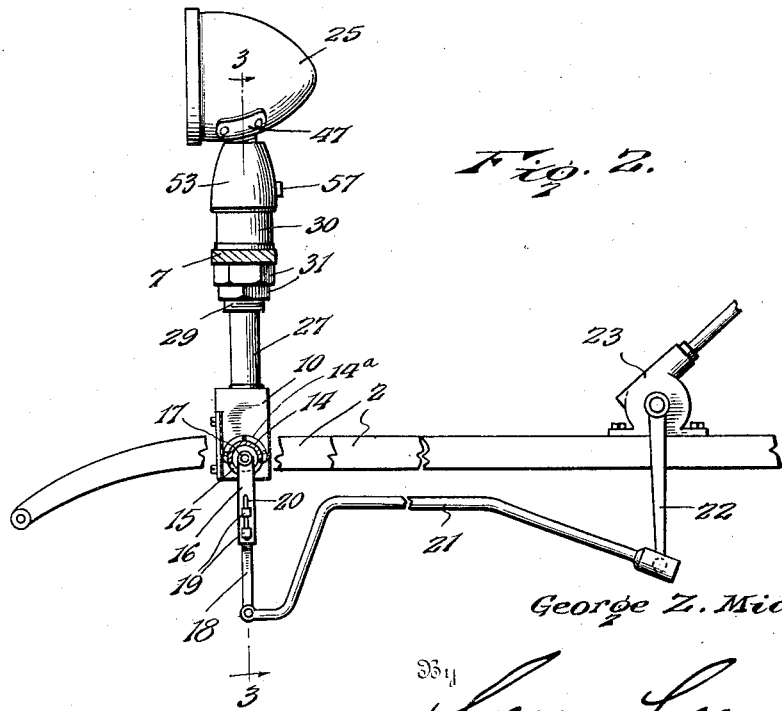
Inventor
George Z. Michaels.
By Lacey & Lacey, Attorneys

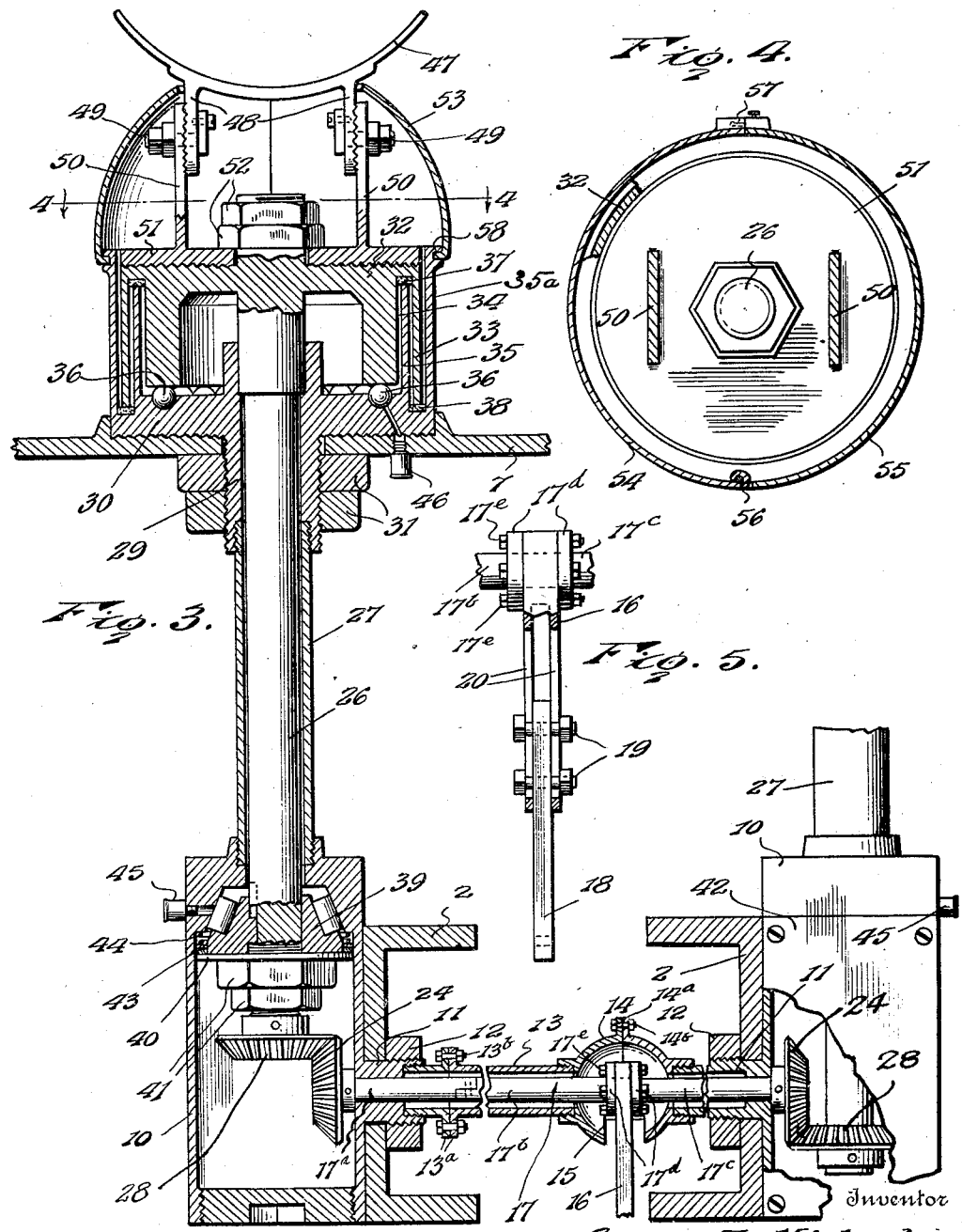

Patented Feb. 17, 1931

1,792,503

UNITED STATES PATENT OFFICE

GEORGE Z. MICHAELS, OF NEW YORK, N. Y.

DIRIGIBLE HEADLIGHT

Application filed March 23, 1929. Serial No. 349,403.

This invention relates to headlights for vehicles and more particularly to a dirigible headlight adapted to turn when the steering wheels are turned to guide the vehicle and thereby cause light from the headlights to be at all times directed in the direction in which a vehicle is to move.

One object of the invention is to provide an automobile with dirigible headlights which may be applied thereto without changes in the conventional construction of the automobile and to allow the headlights to be disposed at opposite sides of the radiator and supported by a cross bar serving as a brace for mud guards of the automobiles.

Another object of the invention is to permit the headlights to be adjusted by vertical tilting and firmly secured after being so adjusted and thereby cause the headlights to properly project light forwardly at a proper height and allow a roadway to be well illuminated.

Another object of the invention is to so connect the headlights with rotatable shafts constituting their posts that they may be adjusted by horizontal turning in order to cause them to focus properly.

Another object of the invention is to provide the rotatable posts of the headlights with bearings which may be adjusted in order to prevent the posts from having vertical movement and thereby eliminate vibration.

Another object of the invention is to provide improved means for connecting the turning mechanism of the headlights with the steering gear of an automobile and permit adjustments to be made so that when the steering gear is actuated to turn the front wheels of an automobile when guiding the headlights will be turned to a similar extent.

The invention is illustrated in the accompanying drawings, wherein

Figure 1 is a front elevation showing the improved dirigible headlights applied to an automobile of a conventional construction.

Fig. 2 is an enlarged view showing the improved headlights and associated parts of the automobile partially in section and partially in side elevation, Fig. 3 is an enlarged vertical sectional view taken on the line 3—3 of Fig. 2, Fig. 4 is a transverse sectional view taken on the line 4—4 of Fig. 3, and Fig. 5 is an enlarged view partially in elevation and partially in section and illustrating the formation of the lever by means of which the main shaft of the apparatus is controlled.

The automobile, which is indicated in general by the numeral 1, is of a conventional construction and includes the usual chassis having side chassis bars 2 supported above the front axle 3 by the usual springs 4. The automobile also includes the usual mud guards 5 which extend above the front steering wheels 6 and these mud guards are braced by a bracing bar 7 which extends in front of the radiator 8 and has its ends secured to the skirts 9 of the mud guards.

Gearing housings 10 are disposed at opposite sides of the chassis against the outer faces of the chassis bars 2 and each gear housing is provided with a neck 11 projecting from one side and passed through an opening formed in the chassis bar against which its housing fits. These necks project inwardly from the chassis bars, as shown in Fig. 3, and have their free end portions threaded in order to carry securing nuts 12 by means of which the gear housings are tightly clamped to the chassis bars. A shaft casing 13 extends between the chassis bars with its ends threaded into the necks 11 and intermediate its length the shaft casing is provided with a housing 14 slotted in its lower portion, as shown at 15 so that a lever 16 carried by a shaft 17 extending axially through the casing 13 may project downwardly from the shaft casing. The shaft casing 13 and housing 14 are formed in sections having abutting ends formed with flanges 13$^a$ and 14$^a$ secured together by removable fasteners 13$^b$ and 14$^b$ and, therefore, the casing and housing may be taken apart when repairs or adjustments are necessary. This also facilitates assemblage. The shaft 17 is also formed in sections designated 17$^a$, 17$^b$ and 17$^c$ which are releasably secured to each other, the sections 17$^a$ and 17$^b$ having adjoining ends overlapped and secured by a removable fastener and the sections 17$^b$ and 17$^c$ having flanges 17ᵈ at their adjacent ends between which the lever 16 is secured by removable fasteners 17ᵉ. By this arrangement the shaft may be easily set in place or removed. The lever 16 is hollow, as clearly shown in Fig. 5, and carries an extension 18 consisting of a bar slidably received in the lever and secured by bolts 19, which extend transversely through the bar and project through slots 20 formed in opposite side walls of the lever. Therefore, the extension bar may be adjusted longitudinally and secured in a set position and the effective length of the lever controlled. The lower or free end of the extension bar 18 is pivoted to the forward end of a rod 21 which extends rearwardly, as shown in Fig. 2, and has its rear end secured to the arm 22 of the steering gear 23 by means of which the front wheels of the automobile are turned in order to guide it, and by an inspection of Fig. 2 it will be readily seen that by vertically adjusting the extension 18 of the lever and securing it in a set position the extent to which the shaft 17 is rotated when the steering gear is actuated to turn the front wheels of an automobile while guiding will be controlled. The ends of the shaft 17 which may be referred to as the main shaft of the dirigible headlight actuating mechanism extend through the necks 11 into the gear housings and carry beveled gears or pinions 24 which are secured to the shaft in any desired manner.

Each of the headlights 25 is supported by means of a post 26 which extends vertically through a tubular casing 27 projecting upwardly from one of the gear housings 10. Each post extends downwardly into its gear housing and at its lower end carries a bevel gear or pinion 28 which meshes with a cooperating pinion 24 so that, when the main shaft 17 is rotated, rotary motion will be imparted to the post. It should be noted that the pinion carried by one post is secured thereon beneath the cooperating pinion of the main shaft, whereas the pinion of the other post engages the upper portion of its cooperating pinion. Therefore, when the main shaft is rotated in order to impart rotary motion to the two posts, these posts will be rotated in the same direction. The upper end of each casing 27 is engaged with the depending neck 29 of a cup 30 which rests upon the cross bar 7, and this cup is firmly held to the cross bar by securing nuts 31 which, when tightened, will cause the roughened surfaces of the cross bar and cup to be held in firm frictional engagement with each other. Therefore, the cup will be prevented from turning. Adjacent the upper end of the shaft 26 is provided a head 32 which is rigid with the shaft and preferably formed integral therewith. This head is formed with an outer annular wall 33 defining an annular pocket 34 to receive an inner annular wall 35 spaced from the walls of the cup 30 and when the shaft 26 is slipped downwardly through the cup 30 and casing or column 27 the head 32 rests upon bearing balls 36 carried by the cup 30 and the flanges 33 and 35 of the head and cup are disposed in overlapping relation to each other, as shown clearly in Fig. 3, with the upper edge of the flange 35 bearing against a felt washer 37 and the annular wall or flange 33 of the head resting upon a felt washer 38 disposed in the cup between the flange 35 of the cup and the walls thereof. After the post 26 has been passed downwardly through its column or casing into the gear housing at the bottom of the column an adjustable roller bearing 39 is fitted about the post and this bearing is supported by a washer 40 and nuts 41 which are threaded upon the post. Therefore, the bearing 39 may be vertically adjusted until the post is prevented from having upward movement but at the same time allowed to turn easily. If any of the parts become worn, it is merely necessary to remove the face plate 42 of the gear housing and the bearing may be adjusted until the wear has been compensated for. A felt washer 43 rests upon the washer 40 about the bearing 39 where it is held by a spring 44 and serves to prevent grease from leaking past the washer 40 and downwardly into the gear housing. By this arrangement grease which is fed into the upper portion of the gearing housing about the bearing 39 by means of a grease cup 45 will be prevented from leaking downwardly thereby eliminating waste of grease and also eliminating danger of the bearing not being properly lubricated. The washers 37 and 38 serve to prevent grease which is forced into the cup 30 by means of a grease cup 46 from working out of the cup. A certain amount of the grease may work past the felt washer 37 but it will not be sufficient to work past the washer 38. Therefore, the head 32 will be permitted to turn easily in the cup 30 when the headlights are to be turned.

Each of the headlights is firmly secured to a yoke 47 and this yoke is provided with depending feet 48 through which are passed bolts 49 pivotally connecting them to arms 50 which project upwardly from a plate 51 at opposite sides of an opening formed centrally therein and through which the upper end of the post 26 projects. The plate 51 rests upon the upper surface of the head 32 and the contacting surfaces of the plate and head are roughened so that, when securing nuts 52 carried by the upper end of the post 26 are tightened, the plate will be firmly bound against the head and thereby cause this plate to rotate with the post. By this arrangement the headlights will be caused to turn when the post to which they are connected are rotated and, therefore, the headlights will turn in the direction in which the steering wheels of an automobile are turned. By loosening the securing nuts 52, the headlights may be turned horizontally independent of their posts and, therefore, the two headlights may be adjusted when first installed until light from the headlights are directed straight ahead of the automobile when it is moving forwardly and they may be similarly adjusted if found necessary at any other time. After the headlights have been adjusted, the securing nuts 52 are tightened and ordinarily the headlights will not slide out of proper position relative to their posts. By loosening the bolts 49 the headlights may be tilted in a vertical direction until they properly illuminate a road without being liable to cause glaring headlights. It will thus be seen that the headlights may be vertically and horizontally adjusted so that light from them will be projected forwardly in proper focus with each other and in proper angular relation to a road. A hood 53 is carried by the outer wall 35ª of the cup 30 to extend between the cup and yoke 47 in enclosing relation to the arms 50 and feet 48 and not only provide a good appearance but serve to exclude dust and dirt. Each of these hoods consists of companion sections 54 and 55 which are hinged together, as shown at 56, and adapted to be releasably but securely held in position by a latch or lock 57 when set in place with the lower edge portions of the two sections engaged in a groove extending about the wall of the cup 30, as shown at 58. It will thus be seen that the hoods will be firmly held in place but can be easily removed if necessary.

When the dirigible headlights are installed, they are applied to the automobile as shown and the columns through which the posts extend are supported by the bracing bar 7 with the headlights at opposite sides of the radiator. The gear housings 10 are secured to the chassis bars 2 and the shaft 17 and its casing extend between the gear housings with the ends of the casing 13 engaged with the necks 11 of the gear housings, as shown in Fig. 3. The rod 21 which extends rearwardly from the actuating lever of the shaft 17 is connected with the steering mechanism of the automobile and it will be readily understood that when the steering mechanism is actuated to turn the front wheels of the automobile rotary motion will be imparted to the main shaft 17 and from this shaft transmitted to the rotary post 26. The securing nuts 52 may be loosened if it is found that the headlights do not focus properly and again tightened after necessary adjustment has been made and by loosening the bolts 49 the headlights may be tilted vertically until light from the headlights illuminates a road without being liable to glare in the eyes of the driver of an approaching car. By raising or lowering the extension 18 the effective length of the lever may be controlled so that when the steering gear is actuated to turn the front wheels of the automobile toward the right or left the headlights will be turned to a corresponding extent. Therefore, the headlights may be horizontally and vertically adjusted and also caused to turn toward the right or left in synchronism with the front wheels of the automobile. By adjusting the nuts 40 and 41 wear may be compensated for and vertical movement of the posts prevented. I have, therefore, provided dirigible headlights which may be easily applied to automobiles of a conventional construction and have eliminated vertical vibration.

Have thus described the invention, I claim:

1. In a dirigible headlight mechanism, rotatable headlight posts disposed vertically, casings for said posts having cups at their upper ends to rest upon a support, heads at the upper ends of said post rotatably received in said cups and resting upon the bottoms thereof to limit downward movement of the post, the cups and heads having annular walls overlapped to prevent escape of grease from the cups, headlight holding brackets supported upon said heads and rotatably adjustable thereon and having upper headlight engaging portions adapted to be tilted vertically and secured in set positions, gear housings at the lower ends of said casings adapted to be secured to the chassis of a vehicle, bearings for said post in said housing vertically adjustable and adapted to prevent upward movement of the posts, a shaft casing extending between said housings, a rotatable shaft in said shaft casing extending into said housing, intermeshing gears carried by the shaft and posts within the gear housings, a lever extending from said shaft out of its casing, an extension for said lever longitudinally adjustable, and a rod pivoted to the extension of said lever and adapted to be connected with steering gear of a vehicle.

2. In a dirigible headlight structure, rotatable posts disposed vertically and rotatably mounted, headlight holders carried by the upper ends of said posts, gear housings receiving the lower ends of said posts and adapted to be secured to chassis bars of a vehicle, a shaft casing extending between and secured to said housings, the said shaft casing being formed in sections releasably joined to each other so that the upper half of the casing may be removed bodily, a rotary shaft extending through said casing into said housings, the said shaft being formed in through sections releasably joined to each other, a lever carried by said shaft between two of the sections and projecting therefrom out of the casing, meshing gears in the gear housings carried by the shaft and posts, and means for connecting said lever with the steering gear of a vehicle whereby the shaft will be rotated when the steering gear is actuated and the posts rotated to turn headlights carried by the posts.

3. In a dirigible headlight structure, a pair of vertical posts mounted to rotate in anti-friction bearings, casings enveloping said posts to carry said bearings, means to adjust said bearings, interengaging cups formed respectively on said posts and casings, packings at the end edges of the cups, lamps fixed on the ends of said posts, connections between said posts to cause them to move in synchronism, and means actuated by the steering gear of a vehicle to rotate said shafts.

4. In a dirigible headlight structure, vertical posts to rotatably support the headlights, said posts being mounted in vertically spaced bearings, the upper bearing consisting of horizontal ball races with bearing balls interposed therebetween, the lower bearing consisting of two bearing cones with rollers interposed therebetween, one of the cones being loosely mounted on the shaft, an adjusting nut on the shaft below the cone, a washer of greater diameter than the cone mounted between the nut and the cone, a felt washer on the upper side of said washer and a compression spring above the felt washer to hold it in engagement with the other washer to prevent the escape of grease through the lower bearing.

5. The structure as set forth in claim 4, in which the upper bearing consists of a head mounted on the shaft and a support mounted on the vehicle, the head and the support having annular grooves therein which define inner annular walls which constitute the ball races, and outer concentric annular walls which interfit the walls of one element with the grooves in the other, and a felt gasket interposed between the top of the wall and the bottom of the groove in each instance to form a sealed rotatable joint.

In testimony whereof I affix my signature.

GEORGE Z. MICHAELS.